(12) United States Patent
Nagumo et al.

(10) Patent No.: US 7,672,522 B2
(45) Date of Patent: Mar. 2, 2010

(54) IMAGE DECODING DEVICE AND IMAGE DECODING METHOD

(75) Inventors: Takefumi Nagumo, Tokyo (JP); Yoichi Yagasaki, Tokyo (JP); Teruhiko Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 694 days.

(21) Appl. No.: 10/553,960

(22) PCT Filed: Apr. 19, 2004

(86) PCT No.: PCT/JP2004/005544

§ 371 (c)(1),
(2), (4) Date: Aug. 22, 2006

(87) PCT Pub. No.: WO2004/098184

PCT Pub. Date: Nov. 11, 2004

(65) Prior Publication Data

US 2007/0003149 A1    Jan. 4, 2007

(30) Foreign Application Priority Data

Apr. 25, 2003  (JP) .............................. 2003-122472

(51) Int. Cl.
*G06K 9/36* (2006.01)

(52) U.S. Cl. ..................................... 382/236

(58) Field of Classification Search ......... 382/232–233, 382/236, 238, 244–251; 348/384.1, 394.1–395.1, 348/400.1–416.1; 375/240, 240.12–240.23
See application file for complete search history.

(56) References Cited

U.S. PATENT DOCUMENTS 5,440,345 A * 8/1995 Shimoda ................ 375/240.14
5,652,823 A * 7/1997 Eto ............................. 386/68
5,786,858 A * 7/1998 Yagasaki et al. ........ 375/240.15
5,933,534 A * 8/1999 Yoshimoto et al. .......... 382/236
6,097,877 A * 8/2000 Katayama et al. ............. 386/68
6,169,843 B1 * 1/2001 Lenihan et al. ............... 386/46
6,314,137 B1 * 11/2001 Ono et al. ................... 375/240
7,149,248 B2 * 12/2006 Aggarwal et al. ...... 375/240.12

FOREIGN PATENT DOCUMENTS

| EP | 0 700 221 A2 | 3/1996 |
| EP | 0 700 221 A3 | 3/1996 |
| EP | 0 735 780 | 10/1996 |
| JP | 06-339117 | 12/1994 |
| JP | 6-339117 | 12/1994 |
| JP | 8-214260 | 8/1996 |
| JP | 08-214260 | 8/1996 |
| JP | 10-271444 | 10/1998 |

OTHER PUBLICATIONS

Japanese Office Action mailed Dec. 10, 2008 in counterpart Japanese Application No. 2006-286259. (2 pages).
Supplementary European Search Report dated Oct. 21, 2009, in EP 04 72 8261.

* cited by examiner

*Primary Examiner*—Jose L Couso
(74) *Attorney, Agent, or Firm*—Finnegan, Henderson, Farabow, Garrett & Dunner, L.L.P.

(57) ABSTRACT

This invention realizes an image decoding apparatus and an image decoding method capable of correctly performing a decoding process in short time with a simple construction. In an image decoding apparatus and an image decoding method for performing a decoding process under a prescribed coding method, simple playback frames comprising an I-picture and following prescribed pieces of P-pictures on the basis of the I-picture existing at a desired position in picture data encoded with the coding method are extracted in a fast playback mode.

8 Claims, 10 Drawing Sheets

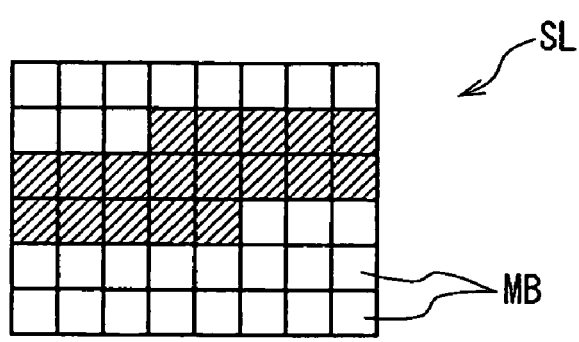
(A)
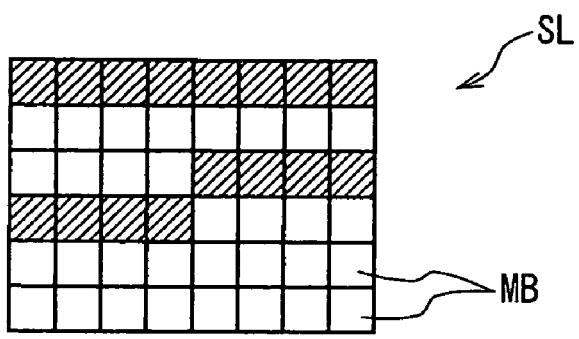
(B)
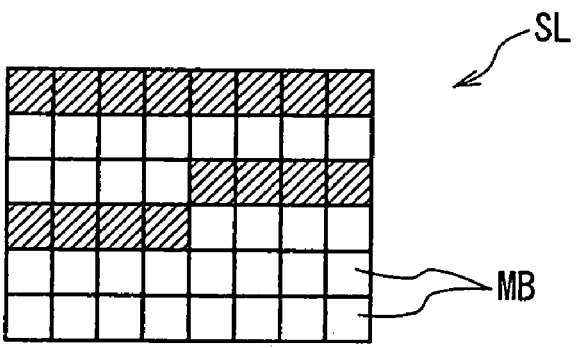
(C)
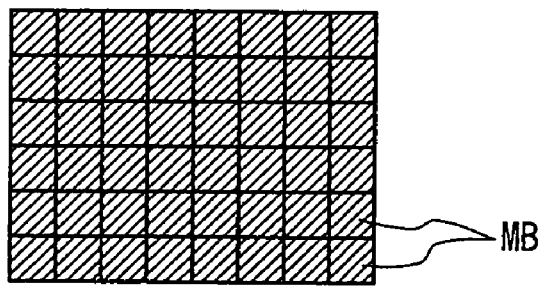
(D)
FIG. 2

|   |   |   |   |
|---|---|---|---|
| 0 | 1 | 4 | 5 |
| 2 | 3 | 6 | 7 |
| 8 | 9 | 12 | 13 |
| 10 | 11 | 14 | 15 |

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

| Intra4×4LumaPredMode[4×4LumaBlkIdx] | Name of Intra4×4LumaPredMode[4×4LumaBlkIdx] |
|---|---|
| 0 | Intra4×4Vertical (prediction mode) |
| 1 | Intra4×4Horizontal (prediction mode) |
| 2 | Intra4×4DC (prediction mode) |
| 3 | Intra4×4Diagonal Down Left (prediction mode) |
| 4 | Intra4×4Diagonal Down Right (prediction mode) |
| 5 | Intra4×4Vertical Right (prediction mode) |
| 6 | Intra4×4Horizontal Down (prediction mode) |
| 7 | Intra4×4Vertical Left (prediction mode) |
| 8 | Intra4×4Horizonal Up (prediction mode) |

IMAGE DECODING DEVICE AND IMAGE DECODING METHOD

TECHNICAL FIELD

This invention relates to an image decoding apparatus and an image decoding method and, for example, is suitably applied to an image decoding apparatus and an image decoding method under the JVT (Joint Model of Enhanced-Compression Video Coding) scheme.

BACKGROUND ART

Recently, for both information distribution of broadcasting stations and information reception of general households, such apparatuses have been proposed that treat picture information by digitizing it, and operate under the MPEG (Moving Picture Experts Group) scheme or the like to compress the information through orthogonal transformation such as discrete cosine transformation, and motion compensation, with making use of redundancy of picture information, in order to realize efficient transmission and storage of the information.

Specifically, the MPEG2 (ISO/IEC 13818-2) is defined as a general image coding method, and is widely used in various applications for professionals and consumers because both interlace images and noninterlace image, and standard resolution images and high fine images can be treated.

With the MPEG compression method, high compression rate and good picture quality can be realized by assigning a coding amount (bit rate) of 4-8 [Mbps] to standard resolution interlace images of 720×480 pixels, and a bit rate of 18-22 [Mbps] to high resolution interlace images of 1920×1088 pixels.

The MPEG2 mainly executes high picture quality coding for broadcasting, but cannot cope with a coding amount (bit rate) lower than that in the MPEG1, that is, a coding method at a higher compression rate.

The needs for such coding method may increase as portable terminals become popular. Therefore, an MPEG4 coding method was standardized. The guidelines for image coding method were approved as international standards of ISO/IEC 14496-2 in December, 1998.

Further, for image coding for video conference, standard guidelines called H. 26L (ITU-T Q6/16 VCEG) are progressing. As compared with the conventional coding methods such as MPEG2 and MPEG4, more operations are required for encoding and decoding but higher encoding efficiency can be realized.

In addition, as a part of popularization of the MPEG4, a JVT coding method which is realized based on the H. 26L and by incorporating functions that the H. 26L does not have has been standardized to realize higher coding efficiency. According to a schedule for standardization, this method would be internationally standardized in the name of H. 26L and MPEG-4 Part 10 (Advanced Video Coding) in March, 2003.

The JVT coding method will be now described. An input picture signal is digitized through the A/D conversion, and then frame pictures are rearranged according to a GOP (Group of Pictures) structure of picture compression information for output.

As to a picture to be subjected to intra coding, an input picture and differential information of pixel values created through intra prediction are subjected to an orthogonal transformation such as discrete cosine transformation and Karhunen-Loeve transformation, and then the resultant transformation coefficient is quantized.

The quantized transformation coefficient is subjected to reversible encoding such as variable length encoding and arithmetic encoding, and then is stored and output as picture compression information. The quantization process is under rate control in a feedback manner according to the storage state.

The quantized transformation coefficient is subjected to a dequantization process and inverse orthogonal transformation to create decoded picture information. From this information, block distortion is removed through a de-blocking filtering process. Then the resultant information is subjected to an intra prediction process while stored in a frame memory.

In this intra prediction process, information on an intra prediction mode which was applied to blocks/macroblocks is subjected to the reversible encoding process, and is encoded as part of header information of the picture compression information.

In addition, as to a picture to be subjected to inter coding, picture information is subjected to a motion prediction/compensation process and, at the same time, picture information to be referred is read from the frame memory. The information is subjected to the motion prediction/compensation process to create reference picture information. The reference picture information is converted to a differential signal from the picture information.

In the motion compensation/prediction process, motion vector information is simultaneously subjected to the reversible encoding process to create information to be inserted in the header part of picture compression information. The other processes are the same as those applied to picture compression information to be subjected to the intra coding.

In this JVT coding method, when picture information to be input is interlaced scanning, two macroblocks can be encoded in a field mode or a frame mode as one pair (hereinafter, referred to as macroblock pair).

An intra prediction method defined in the JVT coding method will be hereinafter described.

Parameters to be input for the intra prediction process are mb_type, prev_intra4×4 red_mode_flag (if available), rem_intra4×4_pred_mode (if available), intra_chroma_pred_mode (if available), pixel values of neighboring macroblocks (or neighboring macroblock pairs). In addition, parameters to be output are predicted pixel values for the macroblocks (or the macroblock pairs). The intra prediction is performed by using pixel values before the de-blocking filtering process.

The intra prediction method for luminance signals will be now described. As described below, the process for luminance signals is different depending on whether the macroblocks are in the intra 4×4 mode or in the intra 16×16 mode.

First, the process in the intra 4×4 mode is as follows.

This process is applied when mb_part_pred_mode (mb_type, 0) is equal to Intra_4×4. Parameters to be input are prev_intra4×4_pred_mode_flag, rem_intra4×4_pred_mode (if available), and the pixel values (if available) of neighboring luminance blocks before the de-blocking filtering process. Outputs are the prediction values of a luminance signal for the macroblocks. An order of scanning luminance signal 4×4 blocks is shown in FIG. 4.

Now, a process to determine whether the intra prediction of the blocks is "available" or "not available" when the value of adaptive_frame_field_flag is 0 will be described. Inputs for this process are the positions of the luminance blocks, and the values of luminance pixels (before the de-blocking filtering process) subjected to the decoding process, which is included in neighboring blocks. Outputs indicates whether the pixel values of A to M shown in FIG. 5 are "available". 4×4LumaBlkLoc is indicated by 4×4LumaBlkIdx. This is defined as the position of the upper left pixel value of the 4×4Luminance block. The pixel values included in the 4×4Luminance block, which is indicated by the 4×4LumaBlkIdx, are a to p in FIG. 5, and these are predicted from the neighboring pixel values A to M. The positions of the pixel values are indicated by the 4×4LumaBlkLoc. For example, the position of d is represented as follows:

$x$: 4×4LumaBlkLoc[4×4LumaBlkIdx][0]+3

$y$: 4×4LumaBlkLoc[4×4LumaBlkIdx][1]  (1)

In addition, the position of A is represented as follows:

$x$: 4×4LumaBlkLoc[4×4LumaBlkIdx][0]

$y$: 4×4LumaBlkLoc[4×4LumaBlkIdx][1]−1  (2)

When at least one of the following first to third conditions is satisfied, the pixel values A to M are "not available". The first is that the pixel is out of a picture or out of a slice. The second is that the pixel belongs to a block which is processed after the block in the decoding process. The third is that constrainde_intra_pred_flag=0 and the block belongs to an inter macroblock.

When E to H are "not available" and D is "available", the E to H are taken as "available" and D is used as their values.

Next, a process when the value of mb_adaptive_frame_filed flag is 1 and the value of field_pic_flag is 0 will be described. The neighboring pixels A to M for the pixel values a to p shown in FIG. 5 are defined as follows. That is, when the macroblock is in the frame decoding mode, the same process as the case where the value of mb_adaptive_field_flag is 0 will be performed.

When the macroblock is in the field decoding mode and is the top macroblock, the neighboring pixel values are defined as follows:

A:

$x$: 4×4LumaBlkLoc[4×4LumaBlkIdx][0]

$y$: 4×4LumaBlkLoc[4×4LumaBlkIdx][1]−2

I:

$x$: 4×4LumaBlkLoc[4×4LumaBlkIdx][0]−1

$y$: 4×4LumaBlkLoc[4×4LumaBlkIdx][1]  (3)

In addition, when the macroblock is in the field decoding mode and is the bottom field mactroblock, the neighboring pixel values are defined as follows:

A:

$x$: 4×4LumaBlkLoc[4×4LumaBlkIdx][0]

$y$: 4×4LumaBlkLoc[4×4LumaBlkIdx][1]−1

I:

$x$: 4×4LumaBlkLoc[4×4LumaBlkIdx][0]1−1

$y$: 4×4LumaBlkLoc[4×4LumaBlkIdx][1]  (4)

Next, a process to create intra prediction values will be described. Inputs for this process are prev_intra4×4_pred_flag, rem_intra4×4_pred_mode, the position of 4×4 luminance block specified by 4×4LumaBlkIdx, and LumaBlkLoc[4×4LumaBlkIdx]. Output is Intra4×4LumaPredMode[4×4LumaBlkIdx]. FIG. 6 shows ntra4×4LumaPredMode[4×4LumaBlkIdx] and the name of a corresponding prediction mode.

When the values of Intra4×4LumaPredMode[4×4LumaBlkIdx] are 0, 1, 3, 4, 5, 6, 7, and 8, the prediction directions are shown in FIG. 7.

When adaptive_frame_field_flag is 0, or when field_pic_flag is 1, the addresses of the neighboring macroblocks and "availability" are detected as follows. An input for this process is MbAddress (address of the macroblock) and outputs are MbAddressA (address of a macroblock locating on the left side of the macroblock), MbAddressB (address of a macroblock locating above the macroblock), and the addresses "availability" of these two macroblocks.

As to the address MbAddress of a macroblock, when any of the following first to fourth conditions is satisfied: the first is that MbAddress<0, and the second is that MbAddress>Max MbAddress−1, the third is that a macroblock specified by MbAddress belongs to a different slice, and the fourth is that the macroblock specified by MbAddress has not been decoded, the macroblock specified by this MbAddress is taken as "not available".

This process is applied to neighboring macroblocks A and B as follows. That is, in the first process, an input is that MbPairAddressA=MbPairAddress−1, and an output is whether MbPairAddressA is "available". In the second process, an input is that MbPairAddressB=MbPairAddress−(frame_width_in_mbs_minus 1+1) and an output is whether MbPairAddressB is "available".

When adaptive_frame_field_flag is 0 or when Field_pic_flag is 1, the addresses of neighboring macroblocks and "availability" are detected as follows. An input parameter for this process is MbAddressA and outputs are (four) variable numbers of "ExIntra4×4LumaPred".

First, as to a macroblock locating on the left side of the macroblock, when the macroblock specified by MbAddressA is "available" and the mb_type of the macroblock specified by MbAddressA is I_4×4 or SI, the value of ExIntra4×4LumaPredMode can be obtained as follows:

for ($i$=0, $i$<4, 1$i$++)

ExtIntra4×4LumaPreMode[($i$+1)*5]=Intra4×4LumaPreMode[4×4LumaBlkScan(3,1)]  (5)

Intra4×4LumaPredMode is a value assigned to the macroblock specified by MbAddressA.

When the macroblock specified by MbAddressA is not "available" or when its mb_type is not I_4×4 nor SI, the value of ExIntra4×4LumaPredMode can be obtained by the following process:

for ($i$=0, $i$<4, 1$i$++)

ExtIntra4×4LumaPredMode[($i$+1)*5]=2  (6)

Next, as to a macroblock locating above the macroblock, an input parameter is, parameters as MbAddressB outputs are (four) variable values of "ExtIntra4×4LumaPred".

When a macroblock specified by MbAddressB is "available" and the macroblock mb_type_specified by MbAddressB is I_4×4 or SI, the value of ExIntra4×4LumaPredMode can be obtained by the following process.

for (i=0, i<4, 1i++)

ExtIntra4×4LumaPredMode($i$+1)=Intra4×4LumaPredMode[4×4LumaBlkScan($i$,3)]  (7)

Intra4×4LumaPredMode is a value assigned to the macroblock specified by MbAddressB.

When a macroblock specified by MbAddressB is not "available" or when its mb_type is not I__4×4 nor SI, the value of ExIntra4×4LumaPredMode can be obtained by the following process.

for ($i=0, i<4, 1i++$)

ExtIntra4×4LumaPredMode($i$+1)=2     (8)

Next, a process to extract information on the intra prediction mode of a neighboring macroblock pair when the field/frame adoptive encoding is performed on a macroblock basis as described above will be described.

A process which is performed when mb_adaptive_field_flag of the macroblock is 1 and field_pic_flag is 0 will be described.

First, when the macroblock pair is in the frame mode, input information are MbPairAddressA and MbPairAddressB, and output information are (8 in total) ExIntra4×4LumaPredModeTop and ExIntra4×4LumaPredModeBottom of the macroblock for each of top macroblock and bottom macroblock.

For the top macroblock, MbPairAddress A is input as MbAddressA in the process described in the above equation (5), and ExIntra4×4LumaPredModeTop is output as a result. In addition, MbPairAddressB is input as MbAddressB described in the above equation (7), and ExIntra4×4PredModeTop is output as a result.

Next, for Bottpm Macroblock, MbPairAddressA is input as MbAddressA in the process described in the above equation (5), and ExIntra4×4LumaPredModeBottom is output as a result. In addition, MbPairAddressB is input as MbAddressB in the process described in the above equation (7), and ExIntra4×4LumaPredModeBottom is output as a result.

First, when the macroblock pair is in the field mode, input information are MbPairAddressA and MbPairAdressB, and output information are (8 in total) ExIntra4×4LumaPredModeTop and ExIntra4×4LumaPredModeBottom of the macroblock for each of top macroblock and bottom macroblock.

A process for MbPairAddressA of the neighboring macroblock is as follows. That is, MbPairAddressA is input as MbAddressA in the process described in 8. 3. 1. 2. 3. 1, and ExIntra4×4PredModeTop is output as a result. In addition, MbPairAddressA in the process described in the above equation (5) is input, and ExIntra4×4LumaPredModeBottom is output as a result.

When MbPairAddressB of a neighboring macroblock pair is in the filed mode or is not "available", the following process is applied. That is, for the top macroblock of the MB Pair, the process described in the above equation (7) is applied, and as its input, top macroblock of the MB Pair specified by MbPairAddressB is used as MBAddressB. Its output is ExIntra4×4LumaPredModeTop. In addition, bottom macroblock of MBPair specified by the MBPairAddressB is used as MBAddressB. Its output is ExIntra4×4LumaPredModeBottom.

When a neighboring macroblock pair MbPairAddressB is in the frame mode, the following process is applied. That is, for top macroblock of the MB Pair, the process described in the above equation (7) is applied, and as its input, the bottom macroblock of MB Pair specified by MBAddressB is used as MBAddressB. Its output is ExIntra4×4LumaPredModeTop. For bottom macroblock of the MB Pair, the process described in the above equation (7) is applied and as its input, the bottom macroblock of MBPair specified by MBPairAddressB is used as MBAddressB. And its output is ExIntra4×4LumaPredModeBottom.

Figure 8:
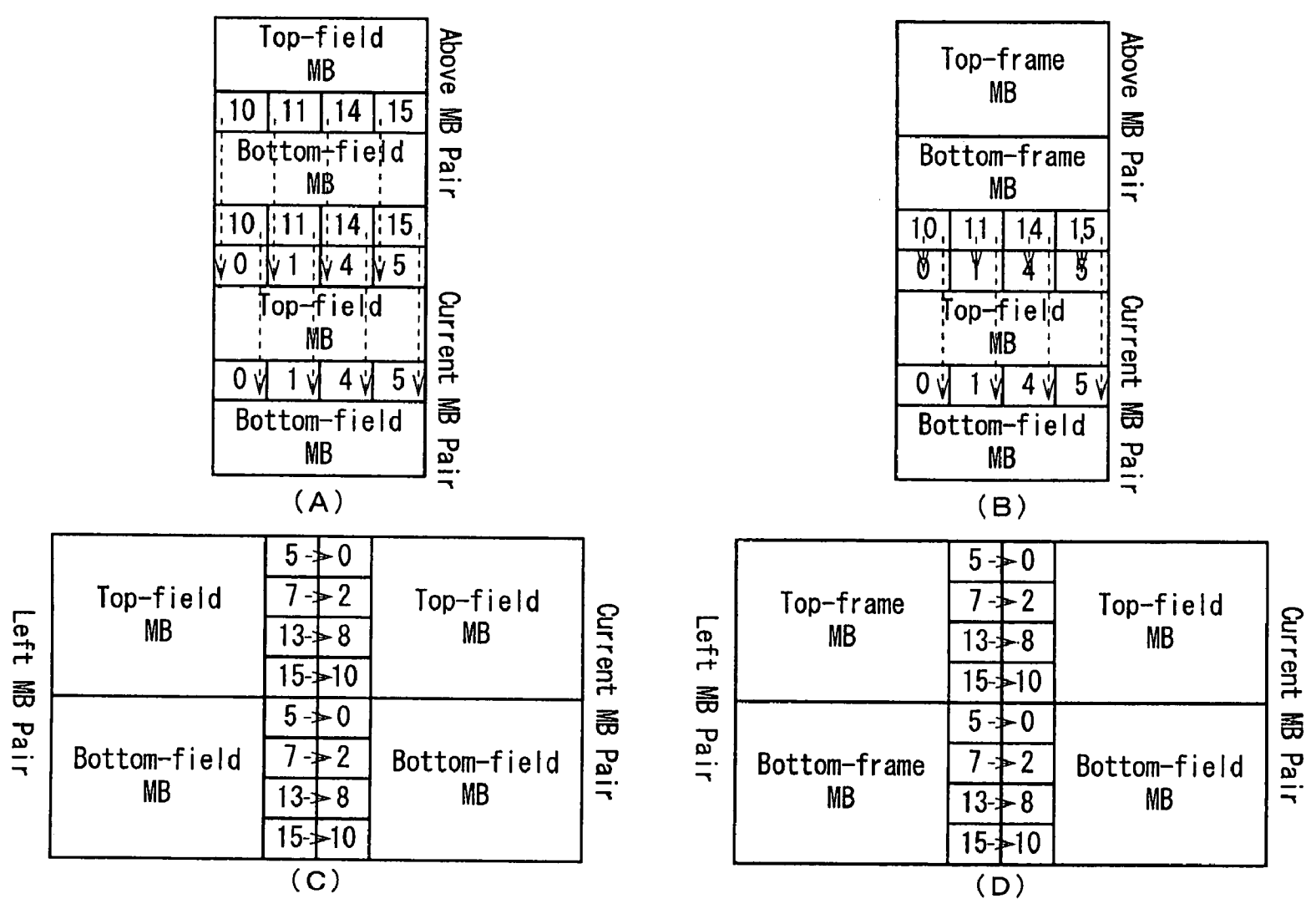

FIG. 8 shows the above processes in a case where the macroblock pair is in the field mode.

Next, the decoding process of Intra4×4LumaPredMode for the macroblock will be described.

This process is applied when adaptive_frame_field_flag is 1, or when field_pic_flag is 1. Input information are prev_intra4×4pred_mode_flag, rem_intra4×4_pred_mode, and ExIntra4×4LumaPredMode. Output information is Intra__4×4LumaPredMode for the macroblock (specified by MbAddress). This process is described with pseudo codes as follows:

```
for (4×4LumaBlkIdx=0,4×4LumaBlkIdx<16,4×
    4LumaBlkIdx++{i=4×4LumaBlkIdx+Ras-
    terTo4×4LumaBlkOffset (4×4LumaBlkIdx)
    Ext4×4LumaBlkIdx=5*(i/4+1)+i
    %4+1PredIntra4×4LumaPredMode=Min(ExIn-
    tra4×4LumaPredMode [Ext4×4LumaBlkIDX−1],
    ExtIntra4×4LumaPredMode [Ext4×4Lum-
    aBlkIdx−5]) if(prev_intra4×4pred_mode_flag__
    [4×4LumaBlkIdx]) Intra4×4LumaPredMode[4×
    4LumaBlkIdx]=PredIntra4×4LumaPredMode
    else{if(rem_itnra4×4_Pred_mode[4×4Lum-
    aBlkIdx]<PredIntra4×4LumaPredMode) Intra4×
    4LumaPredMode[4×4LumaBlkIdx]=rem_intra__
    4×4_pred_moded[4×4LumaBlkIdx] else Intra4×
    4LumaPredMode[4×4LumaBlkIdx]=rem_intra__
    4×4_pred_mode[4×4LumaBlkIdx]+1}ExtIntra4×
    4LumaPredMode[Ex4×4LumaBlkIdx]=Intra4×
    4LumaPredMode[4×4LumaBlkIde]}          (9)
```

Next, a decoding process of Intra4×4LumaPredMode for a macroblock pair (MB Pair) as described above will be described.

This process is applied when mb_adaptive_frame_field_flag is 1 and field_pic_flag is 0.

Prev_intra4×4_pred_mode_flag, rem_intra4×4_pred_mode, ExIntra4×4LumaModePredTop for top macroblock of the macroblock pair are inputs for the process described in the equation (8), and Intra4×4LumaPredMode which is its output is assigned to the top macroblock of the macroblock pair.

Prev_intra4×4_pred_mode_flag, rem_intra4×4_pred_mode, and ExIntra4×4LumaPredMode for bottom macroblock of the macroblock pair are inputs for the process described in the equation (8), and Intra4×4LumapredMode which is its output is assigned to the bottom macroblock of the macroblock pair.

Next the decoding process for the intra prediction in the intra 4×4 mode will be described.

A parameter to be input is Intra4×4LumaPredMode[4×4LumaBlkIdx] which is defined for neighboring pixel values A to M and the 4×4 block shown in FIG. 5, and parameters to be output are predicted pixel values for the 4×4 block specified by 4×4LumaBlkIdx. These will be now described depending on the value of Intra4×4LumaPredMode[4×4LumaBlkIdx]. Any intra prediction mode is used.

A Vertical prediction method will be hereinafter described. This prediction method is applied when Intra4×4LumaPredMode[4×4LumaBlkIdx] is 0. It is applied only when A, B, C, D are "available". Their predicted values are as follows:

a, e, i, m: A e, f, g, h: B i, j, k, l: c m, n, o. p: D     (10)

A Horizontal prediction method will be hereinafter described. Tis prediction method is applied when Intra4×4LumaPredMode[4×4LumaBlkIdx] is 1. It is applied only when I, J, K, L are "available". Their predicted values are as follows:

a, b, c, d: I e, f, g, h: J i, j, k, l: K m, n, o, p: L  (11)

A DC prediction method will be hereinafter described. This prediction method is applied when Intra4×4LumaPredMode[4×4LumaBlkIdx] is 2. The following value is used as a predicted value for all of the pixels a-p.

That is, when A, B, C, D, I, J, K, L are all "available", the predicted value is taken as:

$(A+B+C+i+j+k+l+4)>>3$  (12)

When A, B, C, D are all "unavailable", the predicted value is taken as:

$(I+J+K+L+2)>>2$  (13)

When I, J, K, L are all "unavailable", the predicted value is taken as:

$(A+B+C+D+2)>>2$  (14)

When A, B, C, D, I, J, K, L are all "available", the predicated value is taken as 128.

Diagonal_Down_Left prediction will be hereinafter described. This prediction method is applied when Intra4×4LumapredMode[4×4LumaBlkIdx] is 3. It is applied only when A, B, C, D, I, J, K, L, M are all "available". Their predicated values are as follows:

a: $(A+2B+C+2)>>2$ b, e: $(B+2C+D+2)>>2$ c, f, i: $(C+2D+E+2)>>2$ d, g, j, m: $(D+2E+F+2)>>2$ h, k, n: $(E+2F+G+2)>>2$ l, o: $(F+2G+H+2)>>2$ p: $(G+H+2)>>2$  (15)

Diagonal_Down_Right prediction will be hereinafter described. This prediction method is applied when Intra4×4LumaPredMode[4×4LumaBlkIdx] is 4. It is applied only when A, B, C, D, I, J, K, L, M are "available". Their predicted values are as follows:

m: $(J+2K+L+2)>>2$ i, n: $(I+2J+K+2)>>2$ e, j, o: $(M+2I+J+2)>>2$ a, f, k, p: $(A+2M+I+2)>>2$ b, g, l: $(M+2A+B+2)>>2$ c, h: $(A+2B+C+2)>>2$ d: $(B+2C+D+2)>>2$  (16)

Diagonal_Vertical_Right prediction will be hereinafter described. This prediction method is applied when Intra4×4LumaPredmode[4×4LumaBlkIdx] is 5. It is applied only when A, B, C, D, I, J, K, L, M are "available". Their predicted values are as follows:

a, j: $(M+A+1)>>1$ b, k: $(A+B+1)>>1$ c, l: $(B+C+1)>>1$ d: $(C+D+1)>>1$ e, n: $(I+2M+A+2)>>2$ f, o: $(M+2A+B+2)>>2$ g, p: $(A+2B+C+2)>>2$ i: $(M+2I+J+2)>>2$ m: $(I+2J+K+2)>>2$  (17)

Horizontal_Down will be hereinafter described. This prediction method is applied when Intra4×4LumaPredMode[4×4LumaBlkIdx] is 6. It is applied only when A, B, C, D, I, J, K, L, M are "available". Their predicted values are as follows:

a, g: $(M+I+1)>>1$ b, h: $(I+2M+A+2)>>2$ c: $(M+2A+B+2)>>2$ d: $(M+2A+C+2)>>2$ e, k: $(I+J+1)>>1$ f, l: $(M+2I+J+2)>>2$ i, O: $(J+K+1)>>1$ j, p: $(I+2J+K+2)>>2$ m: $(K+L+1)>>1$ n: $(J+2K+L+2)>>2$  (18).

Vertical_Left predicted values will be now described. This prediction method is applied when Intra4×4LumaPredMode[4×4LumaBlkIdx] is 7. It is applied only when A, B, C, D, I, J, K, L, L, M are "available". Their predicted values are as follows:

a: $(A+B+1)>>1$ b, i: $(B+C>+1)>>1$

C, j: $(C+D+1)>>1$ d, k: $(D+E+1)>>1$ l: $(E+F+1)>>1$ e: $(A+2B+C+2)>>2$ f, m: $(B+2C+D+2)>>2$ g, n: $(C+2D+E+2)>>2$ h, o: $(D+2E+F+2)>>2$ p: $(E+2F+G+2)>>2$  (19)

Horizontal_Up prediction will be now described. This prediction method is applied when Intra4×4LumaPredMode[4×

4LumaBlkIdx] is 8. It is applied only when A, B, C, D, I, J, K, L, M are "available". Their predicted values are as follows:

$a$: $(I+J+1)>>1$ $b$: $(I+2J+K+2)>>2$ $c, e$: $(I+K+1)>>1$ $d, f$: $(J+2K+L+2)>>2$ $g, i$: $(K+L+1)>>1$ $h, j$: $(K+3L+2)>>2$ $k, l, m, n, o, p$: $L$ (20)

An intra prediction method when the luminance signal belongs to a macroblock which is in the intra 16×16 mode will be now described. This process is applied when mb_part_pred_mode (mb_type, 0) is equal to Intra16×16. Parameters to be input are mb_type of the macroblock and the neighboring pixel values of the macroblock before the de-blocking filtering process, and parameters to be output are predicted pixel values for the macroblock.

Hereinafter, the pixel values belonging to the macroblock are represented as P (x, y); x, y=0 . . . 15. In addition, the neighboring pixel values are represented as P(x, −1) and P(−1, y); =−1 . . . 15.

Assume that P(x, −1) and P(−1, y) are "unavailable" when any of the followings is satisfied: they does not exist in the picture or the slice; and neighboring pixel values belong to non-intra macroblocks and constrained_intra_pred_flag is 1.

In the intra 16×16 mode, the intra prediction is conducted with any of the following four methods described below.

Mode 0 is vertical prediction, and is applied only when P(x, −1); x, y=−1 . . . 15 is "available". The created predicted values are as follows:

$Pred(x,y)=P(x,-1); x, y=0 . . . 15$ (21)

Mode 1 is horizontal prediction, and is applied only when P(−1, y); x, y=−1 . . . 15 is "available". The created predicted values are as follows:

$Pred(x,y)=P(-1,y); x, y=0 . . . 15$ (22)

Mode 2 is DC prediction and predicted values are created as follows. That is, when P(x, −1) and P(−1, y); x, y=−1 . . . 15 are all "available", $$Pred(x, y) = \left[\sum_{x'=0}^{15} P(x', 1-) + \sum_{y'=0}^{15} P(1-, y') + 16\right] >> 5 \quad (23)$$

With $x, y = 0 \ldots 15$

When P(x, −1); x, y=−1 . . . 15 are "not available", $$Pred(x, y) = \left[\sum_{y'=0}^{15} P(-1, y') + 8\right] >> 4 \quad (24)$$

With $x, y = 0 \ldots 15$

When P(−1, y); x, y=−1 . . . 15 are "not available", $$Pred(x, y) = \left[\sum_{x'=0}^{15} P(x', -1) + 8\right] >> 4 \quad (25)$$

With $x, y = 0 \ldots 15$

P(x, −1) and P(−1, y); x, y=−1 . . . 15 are all "not available", the predicted value is taken as 128.

Mode 3 is plane prediction. This prediction mode is applied only when P(x, −1) and P(−1, y); x, y=−1 . . . 15 are all "availeble". The predicted values are created as follows:

$Pred(x, y)$ (26)

$Clip1((a + b \cdot (x - 7) + c \cdot (y - 1) + 16) >> 5)$ $a = 16 \cdot (P(1 -, 15) + P(15, -1))$ $b = (5 \cdot H + 32) >> 6$ $c = (5 \cdot V + 32) >> 6$ $$H = \sum_{x-1}^{8} x \cdot (P(7 + x, -1) - P(7 - x, -1))$$

$$v = \sum_{y=1}^{8} y \cdot (P(-1, 7 + y) - P(-1, 7 - y))$$

Clip1 here represents a clipping process within a range of 0 to 255.

The intra prediction for color difference signals will be now described. This process is applied to only I macroblocks and SI macroblocks. Input parameters are intra_chroma_pred_mode and neighboring pixel values before the de-blocking filtering process. Output parameters are predicted values for the color difference signal of the macroblock.

Hereinafter, the pixel values belonging to the macroblock are represented by P(x, y); x, y=0 . . . 7. In addition, the neighboring pixel values are represented by P(x, −1) and P(−1, y)=−1 . . . 7.

The intra prediction mode for color difference signals can be set independently from that for luminance signals.

Assume that P(x, −1) and P(−1, y) are "unavailable" when any of the following conditions is satisfied: they do not exist in the picture or the slice; and neighboring pixel values belong to non-intra macroblocks and constrained_intra_pred_flag is 1.

Mode 0 is DC prediction and its predicted values are as, follows. That is, when P(x, −1) and P(−1, y) are "available", the following is satisfied.

$Pred(x, y)$ (27)

$$\left[\left[\sum_{n=0}^{7} (P(-1,n) + P8n, -1))\right] + 8\right] >> 4$$

With $x, y = 0 \ldots 7$

When P(−1, y) is "not available", the following is satisfied.

$$Pred(x, y) \quad (28)$$

$$\left[\left[\sum_{n=0}^{7} P(n,-1)\right]\right] + 4 >> 3$$

With $x, y = 0 \ldots 7$

When P(x, −1) is "not available", the following is satisfied.

$$Pred(x, y) \quad (29)$$

$$\left[\left[\sum_{n=0}^{7} P(-1,n)\right]\right] + 4 >> 3$$

With $x, y = 0 \ldots 7$

When P(x, −1) and P(−1, y) are "not available", the predicted value is taken as 128.

Mode1 is horizontal prediction and is applied only when P(−1, y) is "not available". Its predicted values are shown as follows:

$$Pred(x,y) = P(-1,y), x, y = 0 \ldots, 7 \quad (3.0)$$

Mode2 is vertical prediction, and is applied only when P(x, −1) is "available". The predicted values are shown as follows:

$$Pred(x,y) = P(x,-1), x, y = 0, \ldots, 7 \quad (31)$$

Mode3 is plane prediction, and is applied only when P(x, −1) and P(−1, y) are "available". The predicted values are shown as follows:

$$Pred(x, y) = Clip1((a + b \cdot (x-3) + c \cdot (y-3) + \quad (32)$$
$$16) >> 5; \quad x, y$$
$$= 0, \ldots, 7$$

$$a = 16 \cdot (P(-1,7) + P(7,-1))$$

$$b = (17 \cdot H + 16) >> 5$$

$$c = (17 \cdot V + 16) >> 5$$

$$H = \sum_{x=1}^{4} x \cdot [P(3+x,-1) - P(3-x,1)]$$

$$V = \sum_{y=1}^{4} y \cdot [P(-1,3+y) - P(-1,3-Y)]$$

By the way, with the JVT coding method, a single macroblock can be divided into a single or plural motion predicted blocks of 16×16, 16×8, 8×8 and the motion compensation process can be performed. Each 8×8 motion predicted block, can be further divided into 8×8, 8×4, 4×8, or 4×4 sub-blocks and the motion compensation process can be performed.

Image reproduction apparatuses for DVD can perform fast playback and fast backward playback as well as normal speed playback from media. FIG. 10 shows a rough construction of the image reproduction apparatus 1.

In this image reproduction apparatus 1, reading position information S1 added to picture information of the MPEG2 format reproduced from a medium 2 is supplied to a reading position indicator 3. When a playback mode signal S2 for fast playback or fast backward playback is received from the outside, this reading position indicator 3 makes a reader 4 specify a reading position suitable for the specified playback mode on the basis of the reading position information S1. This reader 4 uncontinuously reads the bit stream of picture information of the MPEG2 format from the medium 2 according to reading positions specified by the reading position indicator 3.

An image decoding unit 5 performs decoding with the MPEG2 based on the bit stream supplied from the reader 4, so as to restore high fine images from the bit stream.

At this time, in the image reproduction apparatus 1, the reading position indicator 3 should specify reading positions so as to compatibly decode outputs from the reader 4 as a bit stream of the MPEG2 format.

That is, the bit stream of the MPEG2 format for the first I-picture (intra-coded picture, or intra-frame coded picture) and following several P-pictures (frame forward prediction coded pictures) of each GOP of normal picture compression information is extracted from the original bit stream of the picture information in the MPEG2 format. In the MPEG2 method, a P-picture uses an I-picture or a P-picture just before the P-picture as a predicted frame, so that even a stream extracted for fast playback can be compatibly decoded as a stream of the MPEG2 format.

For example, as shown in FIG. 11(A), in the bit stream of the MPEG2 format, I-pictures (I0, I1, . . . ) and P-pictures (P0, P1 . . . ) are encoded at prescribed periods on a GOP basis and then B-pictures (bidirectional prediction coded picture) (B0, B1, . . . ) are encoded and inserted therebetween. That is, as shown in FIG. 11(B), the bitstream of I0, P3, P6, . . . , In, Pn+3 is extracted for fast playback from the bitstream of I0, B1, B2, P3, B4, B5, P6, . . . , In, Bn+1, Bn+2, Pn+3 which is for normal speed playback.

The JVT coding method can use a plurality of predicted frames for a P-picture and also can use B-pictures, which can not be used in the MPEG2 method, as predicted frames. However, even if I-pictures and P-pictures are extracted, as in the case of the conventional MPEG2 method, the relationship for prediction is not fixed, so that predicted frames cannot be made simpler and therefore, the extracted stream cannot be decoded correctly, which is a problem.

That is, in the bitstream of the JVT coding method as shown in FIG. 12(A), not only I-pictures (I0, I1, . . . ) and P-pictures (P0, P1, . . . ) which appear at prescribed periods on a GOP basis but also B-pictures (B0, B1, . . . ) are inserted therebetween as predicted pictures for the P-pictures. That is, as shown in FIG. 12(B), even when the bitstream of I0, P3, P6, . . . , In, Pn+3 is extracted for fast playback from the bit stream of I0, B1, B2, P3, B4, B5, P6, . . . , In, Bn+1, Bn+2, Pn+3 which is for normal speed playback, predicted pictures for P-pictures do not exist, with the result that a problem arises in which correct decoding is difficult to be performed.

DISCLOSURE OF THE INVENTION

This invention has been made in view of foregoing and proposes an image decoding apparatus and image decoding method capable of correctly performing decoding in a short time with a simple construction.

To solve the above problem, this invention provides an imaging decoding apparatus for performing decoding under a prescribed coding method with: a decoding means for decoding picture data encoded with the coding method; and a control means for controlling the decoding means. In a fast playback mode, the control means controls the decoding means so as to extract simple playback frames each comprising an I-picture and following prescribed pieces of P-pictures on the basis of the I-picture existing at a desired position in the picture data.

As a result, this image decoding apparatus decodes not all the picture data but part or all of the picture data as simple playback frames in the fast playback mode, resulting in being capable of performing decoding in shorter time than a normal speed playback mode.

In addition, according to this invention, an image decoding method for performing decoding under a prescribed coding method extracts simple playback frames each comprising an I-picture and following prescribed pieces of P-pictures on the basis of the I-picture existing at a desired position in the picture data encoded with the coding method in a fast playback mode.

As a result, with this image decoding method, not all picture data but part or all of it is decoded as simple playback frames in the fast playback mode, resulting in being capable of performing decoding in shorter time than a normal speed playback mode.

BRIEF DESCRIPTION OF THE DRAWINGS

FIG. 2 is a schematic conceptual diagram explaining a rapid playback method for intra-coded pictures.

FIG. 6 is a schematic plane view explaining a creation process of an intra predicted value.

FIG. 8 is a schematic plane view explaining an intra prediction mode for a neighboring macroblock pair.

BEST MODE FOR CARRYING OUT THE INVENTION

Hereinafter, one embodiment of this invention will be described with reference to the accompanying drawings.

Figure 1:
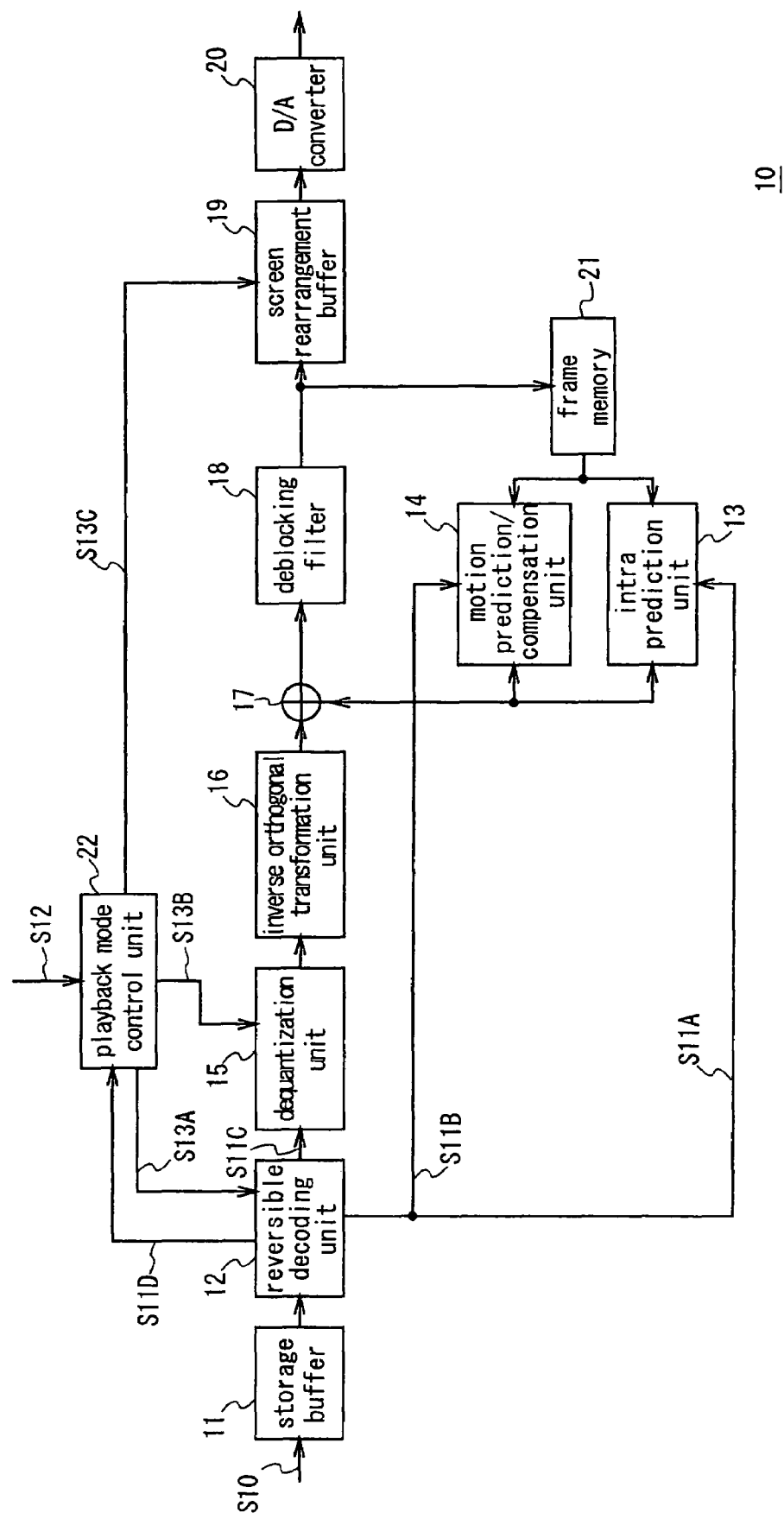
FIG. 1 is a block diagram showing a construction of an image decoding apparatus according to this embodiment.

(1) Construction of an Image Decoding Apparatus Under the JVT Coding Method According to this Embodiment Referring to FIG. 1, reference numeral 10 shows an image decoding apparatus under the JVT coding method according to this embodiment. Picture compression information S10 comprising a bit stream externally input is restored into high fine pictures for display while being sequentially decoded according a playback mode externally specified.

The externally input picture compression information S10 is stored in a storage buffer 11, and then is read and sent to a reversible decoding unit 12 at prescribed timing. The reversible decoding unit 12 performs variable length decoding and arithmetic decoding according to the predetermined format of the picture compression information.

At this time, the reversible decoding unit 12 determines which coding method a frame picture based on the picture compression information S10 has been subjected to, intra coding or inter coding. In a case of the intra coding, the reversible decoding unit 12 decodes intra prediction mode information S11A written in the header part of the picture compression information S10 as well and sends it to an intra prediction unit 13. In a case of the inter coding, the reversible decoding unit 12 decodes motion vector information 11B written in the header part of the picture compression information S10 as well and then sends it to a motion prediction/compensation unit 14.

A quantized transformation coefficient S11C which is an output of the reversible decoding unit 12 and has been subjected to discrete cosine transformation and Karhunen-Loeve transformation is dequantized by a dequantization unit 15 and sent to an inverse orthogonal transformation unit 16. This inverse orthogonal transformation unit 16 performs four-dimensional orthogonal transformation based on a prescribed method on the received transformation coefficient S11C and gives the resultant to one input terminal of an adder 17.

When the reversible decoding-unit 12 confirms the intra coding, a predicted picture created by the intra prediction unit 13 is input to the other input terminal of the adder 17. The adder 17 composes the picture information subjected to the inverse orthogonal transformation and the predicted picture, and gives the composition result to a deblocking filter 18 where block strains are eliminated.

The output of the adder 17 which is obtained through the deblocking filter 18 is temporarily stored in a screen rearrangement buffer 19 and then is converted into analog by a D/A converter 20, and on the other hand, is temporarily stored in a frame memory 21 and then the above-described predicted picture is created by the intra prediction unit 13.

When the reversible decoding unit 12 confirms the inter coding, on the other hand, a reference picture created by the motion prediction/compensation unit 14 is input to the other input terminal of the adder 17. The adder 17 composes the picture information subjected to the inverse orthogonal transformation and the reference picture and then gives the composition result to the deblocking filter 18 where block strains are eliminated.

The output of the adder 17 which is obtained through the deblocking filter 18 is temporarily stored in the screen rearrangement buffer 19 and then is converted into analog by the D/A converter 20, and on the other hand, is temporarily stored in the frame memory 21 and the above-described reference picture is created in the motion prediction/compensation unit 14 based on the picture information stored in the frame memory 21 and motion vector information subjected to the reversible decoding process.

In addition to the above construction, the image decoding apparatus 10 according to this embodiment is provided with a playback mode control unit 22 which can change a decoding method for the bit stream of the picture compression information S10 according to a playback mode externally specified. For example, in a case of a playback mode for normal speed playback, the image decoding apparatus 10 performs image decoding with a decoding method under the JVT coding method.

In a special playback mode for fast forward or fast backward, not the decoding method under the JVT coding method but the rapid playback of the bit stream of the picture compression information S10 is performed in this embodiment.

In this image decoding apparatus 10, the playback mode control unit 22 receives a playback mode signal S12 indicating a playback mode from the outside and also receives decoded picture information S11D including decoded pictures, slices (aggregate of macroblock), decoding type of macroblock, frame number and macroblock position, from the reversible decoding unit 12.

The playback mode control unit 22 sends a bit reading position signal S13A to the reversible decoding unit 12 according to a playback mode based on the playback mode signal S12 and also sends a transformation coefficient control signal S13B to the dequantization unit 15, and further sends a picture display signal S13C to the screen rearrangement buffer 19.

(2) Simple Playback Method in Fast Playback

When a playback mode for fast playback or backward playback is specified with the playback mode signal S12, the playback mode control unit 22 performs rapid playback on first several frames in an order of decoding from the first I-picture, and uses part or all pictures of them as pictures for the fast playback.

That is, in the bit stream of the picture compression information S10 between an I-picture I0 which is a frame just after a random access point and a next I-picture In, the playback mode control unit 22 uses only three frames (hereinafter, these are referred to as simple playback frames) of the I-picture I0, and P-pictures P3 and P4 for irregular playback according to the playback mode. To obtain these simple playback frames, the bit stream of I0, B1, B2, P3, B4, B5 and P6 should be decoded because of predicted pictures.

When a playback mode is "fast forward", the playback mode control unit does not necessarily decode a bit stream (hereinafter, referred to as skip stream) after decoding the P-picture P6 which does not include a display picture and just before the I-picture In, and sends a bit reading signal representing this matter to the reversible decoding unit 12, so that the reversible decoding unit 12 skips the skip stream without decoding it.

At this time, the playback mode control unit 22 sends a picture display signal S13C requesting for sequentially displaying the frames of the I-picture I0 and the P-pictures P3, P6 composing simple playback frames in order, to the screen rearrangement buffer 19, so that the screen rearrangement buffer 19 sends the simple playback frames for fast playback in the frame display order to the D/A converter 20 of the later stage.

When the playback mode is "backward", the playback mode control unit 22 sends a bit reading position signal S13A requesting for finding a random access point existing before the I-picture 10 in the bit stream of the picture compression information S10, to the reversible decoding unit 12, so that the reversible decoding unit 12 searches the bit stream for the random access point before the simple playback frame.

At this time, the playback mode control unit 22 sends a picture display signal S13C requesting for sequentially displaying the frames of the I-picture I0, the P-pictures P3 and P6 composing the simple playback frames in a reverse order, to the screen rearrangement buffer 19, so that the screen rearrangement buffer 19 sends the simple playback frames for the fast backward playback in the frame display order, to the D/A converter 20 of the later stage.

Even when the playback mode is either "fast forward" or "backward", the playback mode control unit 22 sends a transformation coefficient control signal S13B to the dequantization unit 15 on the basis of the coding type and its position of a picture, slice, macroblock obtained from the reversible decoding unit 12, to the dequantization unit 15, the control signal S13B indicating that decoding of transformation coefficients is unnecessary or only the DC (Direct Current) components of the transformation coefficients are to be decoded. The dequantization unit 15 sends the transformation coefficients 0 or only the DC components to the inverse orthogonal transformation unit 16 without performing dequantization process.

As a result, when the input transformation coefficients are all 0 or only DC components, the inverse orthogonal transformation unit 16 and the following adder 17 are capable of simplifying the inverse orthogonal transformation process and the addition process, resulting in reducing decoding time within a frame. In actual, in a case of decoding-only the DC components of the transformation coefficients, the inverse orthogonal transformation unit 16 performs the multiplication of the DC components of the transformation coefficients, instead of the four-dimensional inverse orthogonal transformation.

(2-1) Simple Playback Method of Intra-Coded Pictures

Methods for a case of extracting and playing simple playback frames from intra-coded pictures will be described in detail in correspondence with the first to fourth rapid playback methods with reference to FIGS. 2(A) to (D). Creation of one slice SL of an intra-coded picture from a plurality of macroblocks MB will be schematically shown. The oblique line parts in these figures represent macroblocks to be decoded.

(2-1-1) First Rapid Decoding Method

A method of decoding preset parts, such as a screen central part, on a slice basis without decoding all macroblocks, at a time of decoding an intra-coded picture (FIG. 2(A)).

As to slices which are not decoded, information on pictures locating at the same positions as those which were decoded in the past can be copied or the second to fourth rapid decoding which will be described as follows can be applied.

(2-1-2) Second Rapid Decoding Method

A method of decoding only some macroblocks in each slice with the JVT coding method and simply decoding the other macroblocks with a spatial prediction method, at a time of decoding an intra-coded picture (FIG. 2(B)).

Macroblocks to be decoded with the JVT coding method are macroblocks from the beginning of the slice for one macroblock line. The other macroblocks are subjected to only the spatial prediction method and the decoding of transformation coefficients is not performed.

(2-1-3) Third Rapid Decoding Method

A method of decoding, with the spatial prediction method, the macroblocks other than the macroblocks to be decoded according to the JVT coding method and recreating only the DC components of the transformation coefficients at a time of decoding an intra-coded picture, in addition to the above-described second rapid decoding method, resulting in realizing more rapid decoding (FIG. (2C)).

In this third rapid decoding method, the AC (Alternative Current) components of transformation coefficients are all treated as 0, so as to simplify the decoding process.

(2-1-4) Fourth Rapid Decoding Method

A method of decoding all macroblocks in each slice with the spatial prediction method and recreating only the DC components of transformation coefficients at a time of decoding an intra-coded picture, so as to realize rapid decoding (FIG. 2(D)). In this case, similarly to the third rapid decoding method, the AC coefficients of the transformation coefficients are all treated as 0, so as to realize more rapid decoding.

The above first to fourth rapid decoding methods can be selectively switched according to a playback mode. In actual, higher picture quality can be obtained in an order of the second, third and fourth rapid decoding methods.

(2-2) Simple Playback Method of Inter-Coded Pictures

Figure 3:
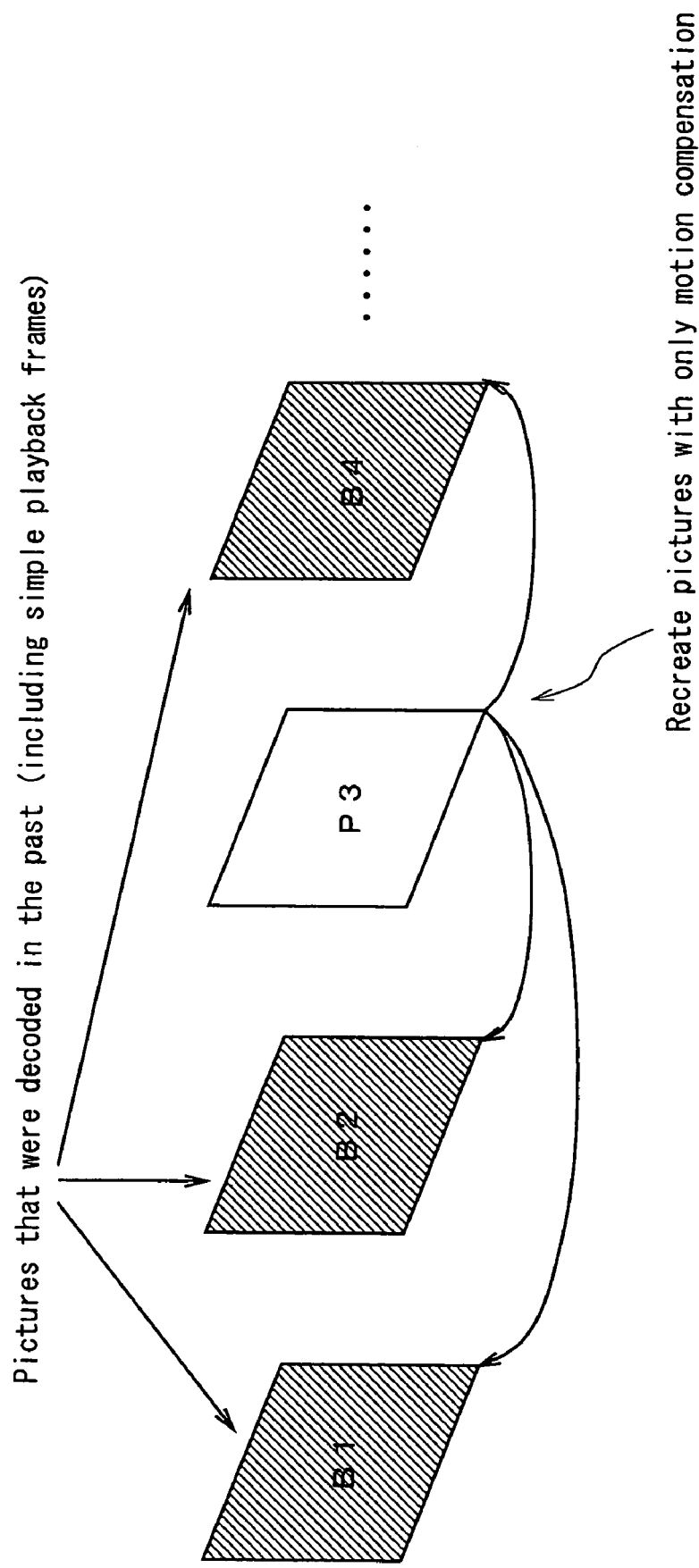
FIG. 3 is a schematic conceptual diagram explaining a rapid playback method for inter-coded pictures.
Figures 4, 5, 7:
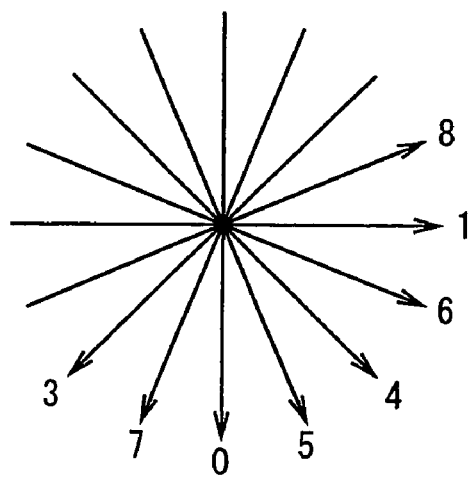
FIG. 4 is a schematic plane view explaining an intra 4×4 mode process.
FIG. 5 is a schematic plane view explaining the intra 4×4 mode process.
FIG. 7 is a schematic plane view explaining the creation process of an intra predicted value.
Figure 9:
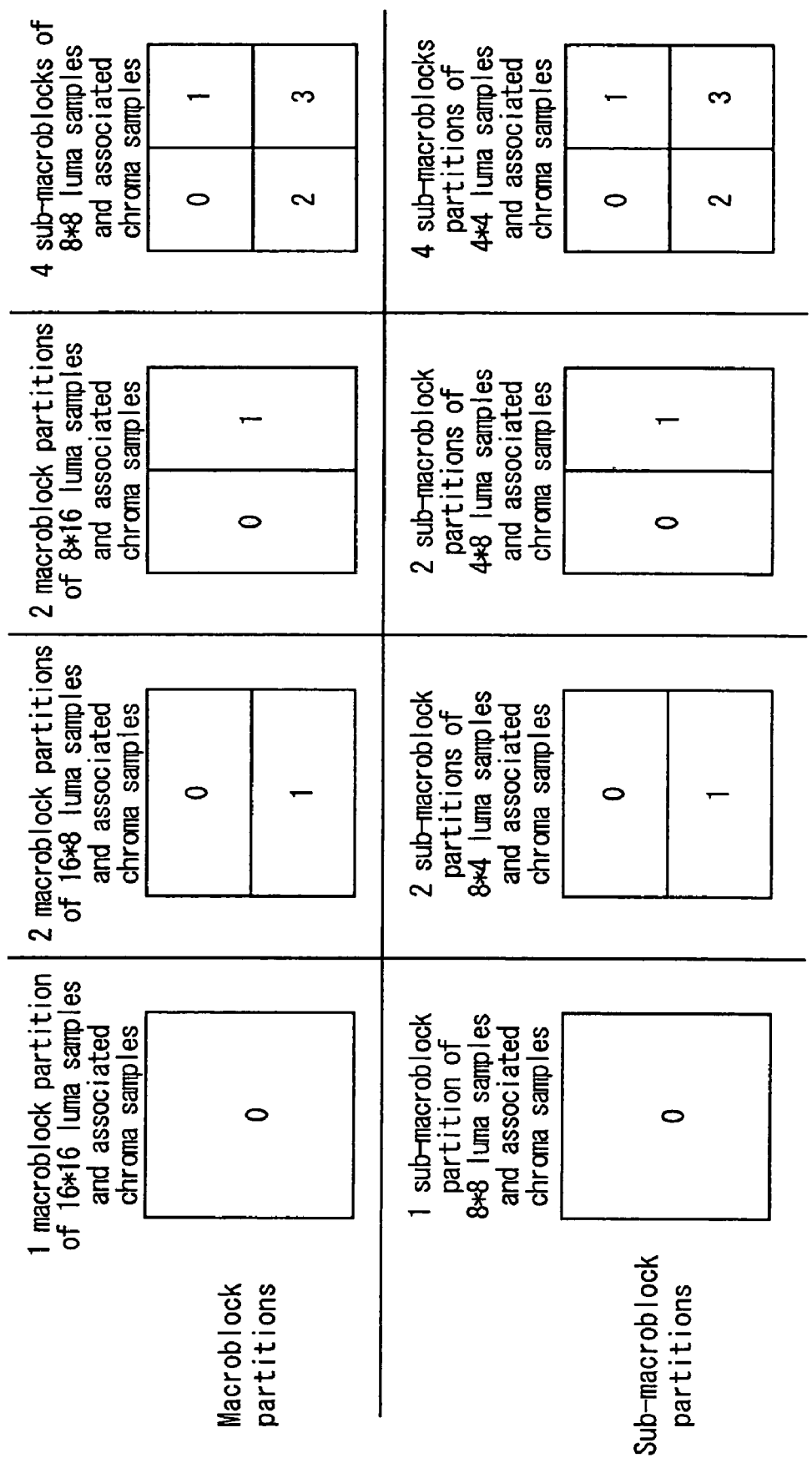
FIG. 9 is a schematic plane view explaining a motion compensation process under a JVT coding method.
Figure 10:
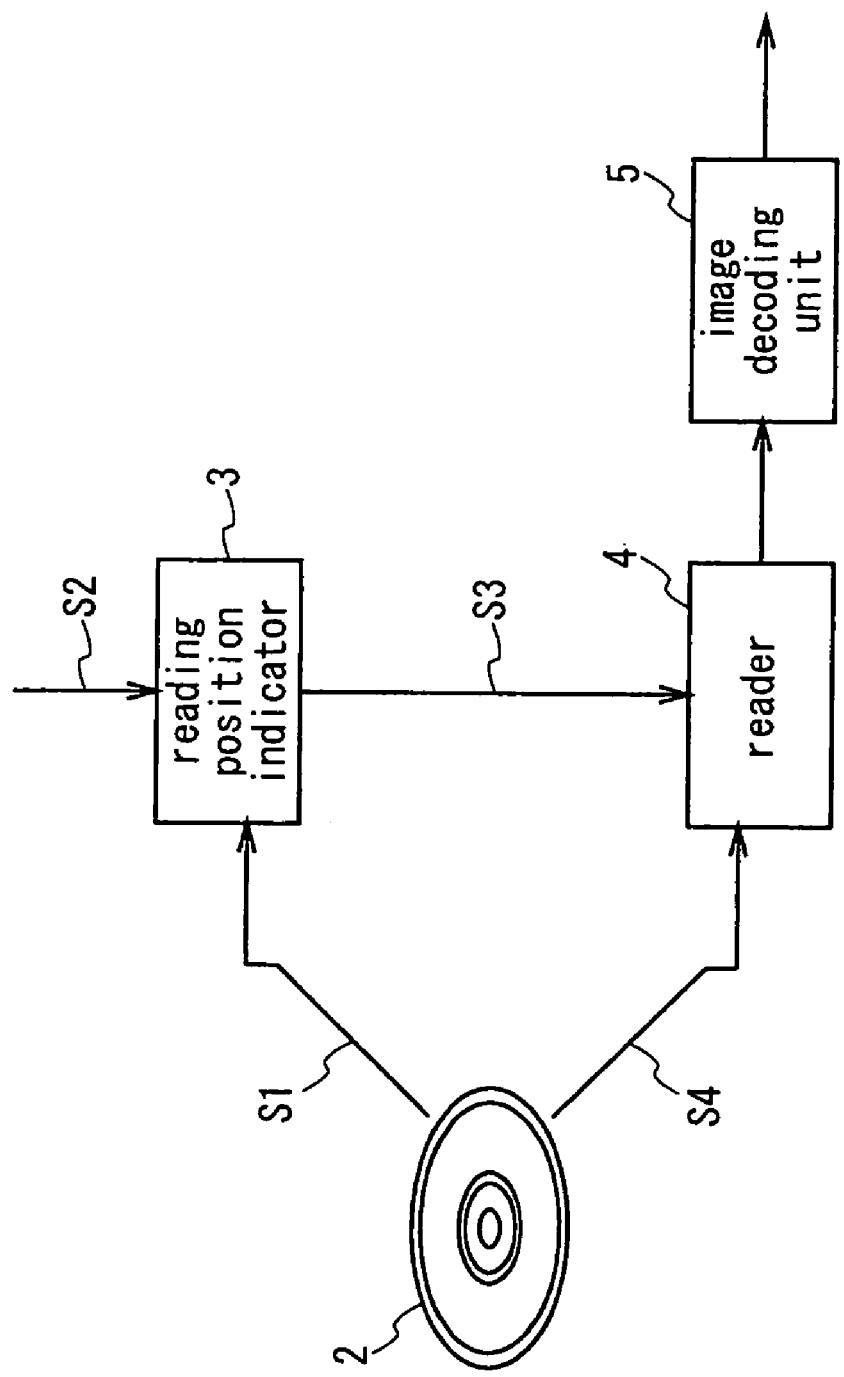
FIG. 10 is a block diagram showing a construction of a conventional image reproduction apparatus.
Figure 11:
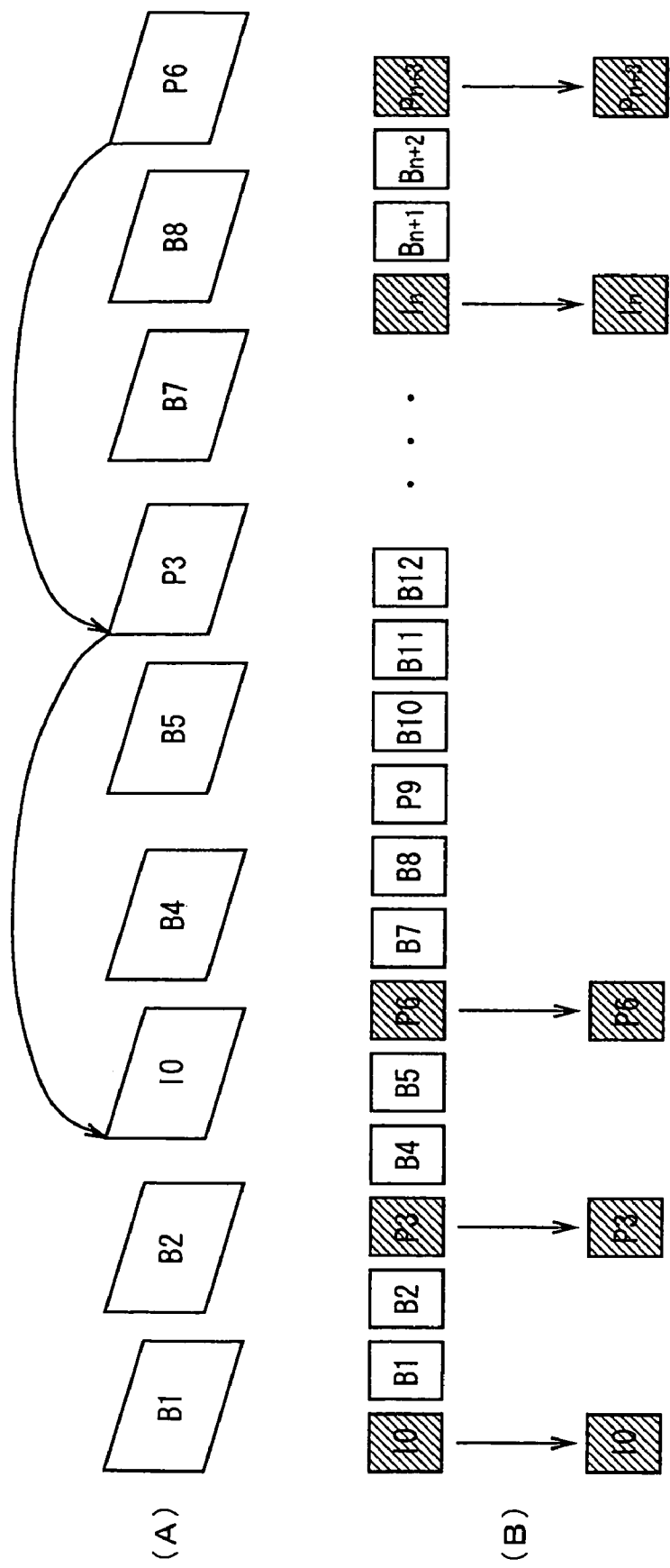
FIG. 11 is a schematic conceptual view explaining a decoding method with an MPEG2 method.
Figure 12:
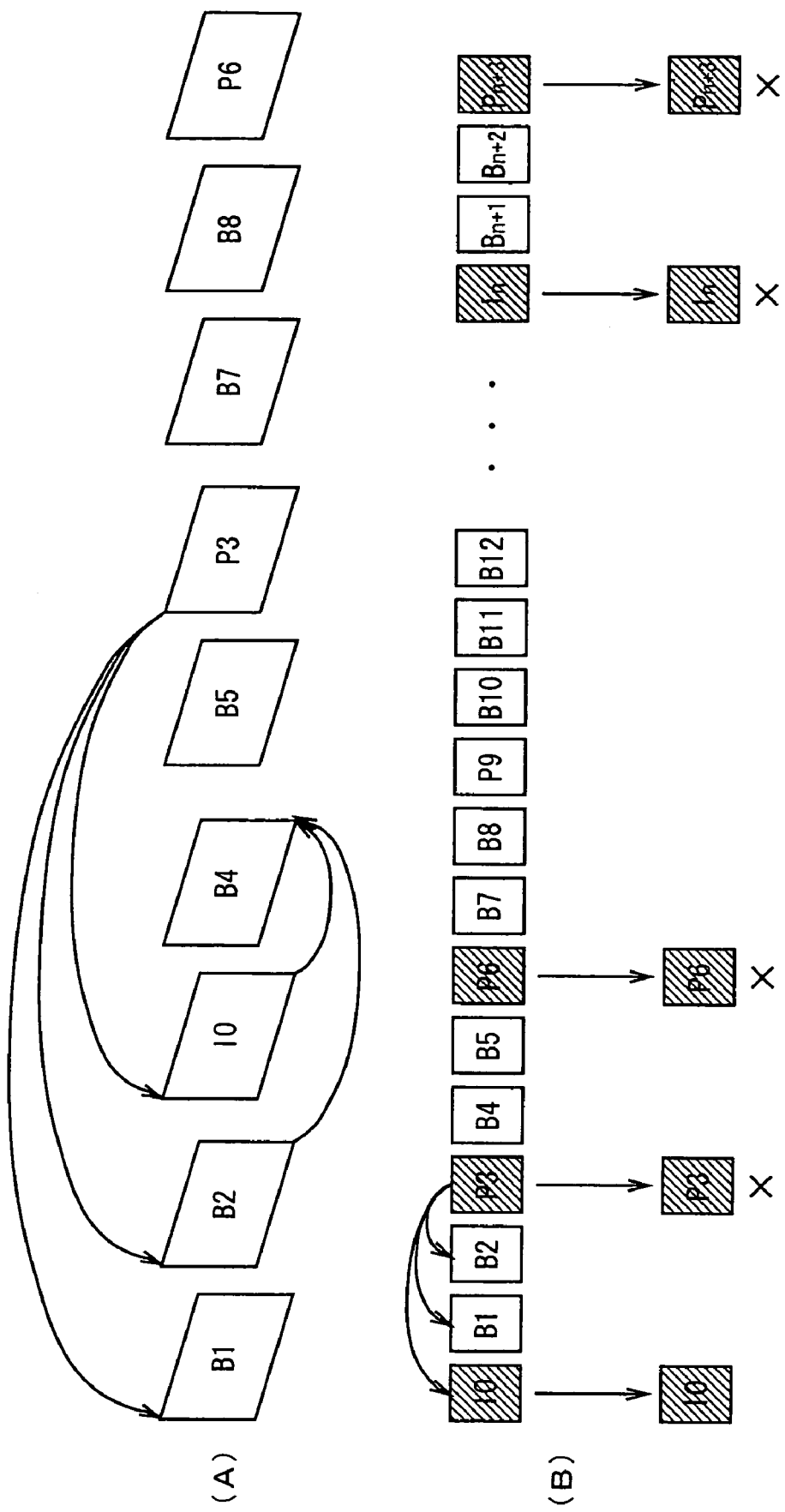
FIG. 12 is a schematic conceptual view explaining a decoding method with the JVT coding method.

For decoding an inter-coded picture, a method of decoding a process according to motion compensation using motion vectors without recreating transformation coefficients (that is, this process is performed with taking all the transformation coefficients as 0, regardless of DC components and AC components), as shown in FIG. 3.

There does not arise a problem if reference pictures to be used for prediction are pictures decoded with the JVT coding method or are recreated pictures which were subjected to the rapid decoding before this frame.

(3) Operation and Effects of this Embodiment

According to the above configuration, when a playback mode is switched from the normal speed playback to the fast playback, the image decoding apparatus 10 for performing a decoding process with the JVT coding method decodes simple playback frames for several pieces of pictures, from the I-picture just after a random access point in the bit stream of the picture compression information S10, excluding B-pictures.

When the fast playback mode represents "fast forward", a skip stream after simple playback frames is skipped so as not to be decoded, and then the I-picture and P-pictures composing the simple playback frames are displayed in order.

When the fast playback mode represents "fast backward", a bitstream is searched for a random access point locating before simple playback frames and the I-picture and P-pictures composing the simple playback frames are displayed in a reverse order.

As described above, the entire bitstream of the picture compression information S10 is not decoded but part of or entire bitstream is decoded as simple playback frames in the fast playback mode, resulting in being capable of performing the decoding process in shorter time than that for the normal speed playback mode.

In addition, at a time of decoding intra-coded pictures, as to a plurality of slices forming each picture of simple playback frames, the image decoding apparatus 10 decodes only part of or entire macroblocks with the JVT coding method on a slice basis. As to the macroblocks which are not the targets of decoding, the apparatus 10 performs the decoding with the spatial prediction method and/or recreates only the DC components of transformation coefficients. As a result, processing time for the decoding process can be reduced.

In a case of decoding inter-coded pictures, by decoding a process according to the motion compensation using motion-vectors without recreating transformation coefficients, processing time for the decoding process can be reduced as well.

According to the above configuration, the image decoding apparatus 10 for performing a decoding process with the JVT coding method is provided with the playback mode control unit 22 for changing a decoding method according to a playback mode externally input, so as to decode part of or entire bit stream of the picture compression information S10 without decoding the entire bit stream in the fast playback mode, resulting in being capable of performing the decoding process in shorter time than that in the normal speed playback mode. As a result, the image decoding apparatus 10 capable of correctly performing the decoding process with a simple construction and in short time can be realized.

(4) Other Embodiments

The above embodiment has described a case of applying an apparatus constructed as shown in FIG. 1, as an image decoding apparatus for performing a decoding process with the JVT coding method (prescribed coding method). This invention, however, is not limited to this and other constructions can be widely applied.

Further, the above embodiment has described a case of using the reversible decoding unit 12 as a decoding means for decoding the picture compression information (picture data) S10 encoded with the JVT coding method, and using the playback mode control unit 22 as a control means for controlling the reversible decoding unit (decoding means) 12. This invention, however, is not limited to this and other constructions or integrated units can be widely applied, provided that they can extract simple playback frames comprising an I-picture and following prescribed pieces of P-pictures on the basis of the I-picture existing at a random access point (desired position) in the picture compression information (picture data) S10 in the fast playback mode.

Furthermore, the above embodiment has described a case of, without decoding pictures after simple playback frames, decoding an I-picture and P-pictures composing the simple playback frames in order when a fast playback mode is forward playback, and of finding a position before simple playback frames and then sequentially decoding an I-picture and P-pictures composing the simple playback frames and then outputting the simple playback frames in a reverse order of the decoding order when a fast playback mode is backward playback. This invention, however, is not limited to this and other methods can be applied, provided that processing time for decoding process for irregular playback according to a fast playback mode can be reduced.

Furthermore, the above embodiment has described a case of decoding part of or all of each slice (information) on a slice basis (in a unit of prescribed information) as to an I-picture and P-pictures of simple playback frames in the picture compression information (picture data) S10 subjected to intra coding (intra frame coding) of the JVT coding method, and of, as to parts which are not the targets of decoding, selectively performing a first process (FIG. 2(A)) to perform no process, a second process (FIG. 2(B)) to decode only spatial prediction under a prediction method signal obtained through the spatial prediction coding (reversible encoding), the third process (FIG. 2(C)) to decode only the DC (Direct Current) components of transformation coefficients with the DCT transformation coding (transformation coding), or the fourth process (FIG. 2(D)) which is a combination of the second and third processes. This invention, however, is not limited to this and the first to fourth processes can be automatically selected according to a playback mode.

In this case, this selection can be made, considering such features that the third and fourth processes can obtain better picture quality than the second process and the third and fourth processes take longer processing time for decoding than the second process.

Further, the spatial prediction coding is applied as the reversible encoding in the second process and the DCT transformation coding is applied as transformation coding in the third and fourth processes. This invention, however, is not limited to this and other coding can be widely applied.

Further, the above embodiment is capable of further reducing the number of frames forming a bit stream with the reversible decoding unit 12 (FIG. 1) when predicted frames in which the picture compression information S10 of the JVT coding method is limited are used. For example, when a frame used for a fast playback mode is a P-picture, prediction relation is limited by making prediction from an I- or P-picture just before, so that the decoding of frames which are not used for display is unnecessary, resulting in obtaining an advantage in which the decoding process can be performed much faster.

According to this invention as described above, an image decoding apparatus for performing a decoding process under a prescribed coding method is provided with a decoding means for performing a decoding process on picture data encoded with a coding process and a control means for controlling the decoding means. In a fast playback mode, the control mans controls the decoding means so as to extract simple playback frames comprising an I-picture and following prescribed pieces of P-pictures on the basis of the I-picture locating at a desired position in the picture data. Therefore, the decoding process can be performed faster than that in the normal speed playback mode, thus making it possible to realize an image decoding apparatus capable of correctly performing the decoding process in shorter time with a simple construction.

Further, according to this invention, in an image decoding method of performing a decoding process under a prescribed coding method, simple playback frames comprising an I-picture and following prescribed-pieces of P-pictures on a basis of the I-picture locating at a desired position in picture data encoded with a coding method are extracted in a fast playback mode. Therefore, the decoding process can be performed in shorter time than that in the normal speed playback mode, thus making it possible to realize an image decoding method capable of correctly performing the decoding process with a simple construction and in short time.

INDUSTRIAL APPLICABILITY

An image decoding apparatus and image decoding method of this invention can be widely applied to an image reproduction apparatus capable of reproducing digital pictures obtained from recording media such as DVDs and digital broadcasting.

Description of reference numerals

10 . . . image decoding apparatus, 12 . . . reversible decoding unit, 13 . . . intra prediction unit, 14 . . . motion prediction/compensation unit, 15 . . . dequantization unit, 16 . . . inverse orthogonal transformation unit, 17 . . . adder, 18 . . . deblocking filter, 19 . . . screen rearrangement buffer, 21 . . . frame memory, 22 . . . playback mode control unit

The invention claimed is:

1. An image decoding apparatus for performing a decoding process under a prescribed coding method, comprising:
   a decoding unit configured to perform the decoding process on picture data encoded with the coding method; and
   a control unit configured to control the decoding unit based on types of a mode signal received by the control unit such that the decoding unit:
   performs a first process as part of the decoding process to extract and decode an I-picture and prescribed pieces of P-pictures based on a location of the I-picture in the picture data when the received mode signal is of a first type;
   performs a second process as part of the decoding process to decode a macroblock in the picture data based on a prediction signal obtained through reversible encoding when the received mode signal is of a second type; and
   performs a third process to decode as part of the decoding process direct current components of transformation coefficients with transformation coding when the received mode signal is of a third type.

2. The image decoding apparatus according to claim 1, wherein the I-picture and the P-pictures are in a simple playback frame, and the control unit controls the decoding unit to decode the I-picture and the P-pictures in order without decoding a part of the picture data included after the simple playback frame when the first type is fast forward playback.

3. An image decoding method for performing a decoding process under a prescribed coding method, the image decoding method being executed by a decoding unit and comprising:
   detecting types of a mode signal used to control the image decoding method performed by the decoder;
   performing, by using the decoder, a first process to extract and decode an I-picture and prescribed pieces of P-pictures based on a location of the I-picture in picture data encoded with the coding method when the mode signal is detected to be of a first type;
   performing, by using the decoder, a second process to decode a macroblock in the picture data based on a prediction signal obtained through reversible encoding when the mode signal is detected be of a second type; and
   performing a third process to decode direct current components of transformation coefficients with transformation coding when the mode signal is detected to be of a third type.

4. The image decoding method according to claim 3, wherein the I-picture and the P-pictures are in a simple playback frame, and the I-picture and the P-pictures are decoded in order without decoding a part of the picture data included after the simple playback frame when the first type is a fast forward playback.

5. The image decoding apparatus according to claim 1, wherein the I-picture and the P-pictures are in a simple playback frame, and when the first type is a fast backward playback the control unit controls the decoding unit to:
   find a part before the simple playback frame;
   sequentially decode the I-picture and the P-pictures in the simple playback frame; and
   output the simple playback frame in a reverse order of a decoding order.

6. The image decoding method according to claim 3, wherein the I-picture and the P-pictures are in a simple playback frame, and when the first type is a fast backward playback the image decoding method further comprises:
   finding a part before the simple playback frame;
   decoding, sequentially, the I-picture and the P-pictures in the simple playback frame; and
   outputting the simple playback frame in a reverse order of a decoding order.

7. The image decoding apparatus according to claim 1, wherein the decoding unit performs a fourth process as part of the decoding process when the received mode signal is of a fourth type, the fourth process being a combination of the second and third processes.

8. The image decoding method according to claim 3 further comprising performing a fourth process when the mode signal is detected to be of a fourth type, the fourth process being a combination of the second and third processes.

* * * * *

UNITED STATES PATENT AND TRADEMARK OFFICE
CERTIFICATE OF CORRECTION

| | | |
|---|---|---|
| PATENT NO. | : 7,672,522 B2 | |
| APPLICATION NO. | : 10/553960 | |
| DATED | : March 2, 2010 | |
| INVENTOR(S) | : Takefumi Nagumo et al. | |

It is certified that error appears in the above-identified patent and that said Letters Patent is hereby corrected as shown below:

\*   On the Title Page, Item (75), in the Inventors, lines 2-3,
    "Teruhiko Suzuki, Tokyo (JP)" should read
    --Teruhiko Suzuki, Chiba (JP)--.

In claim 2, column 20, line 10, "is fast forward" should read
    --is a fast forward--.

In claim 3, column 20, line 25, "detected be" should read
    --detected to be--.

In claim 5, column 20, lines 39-40, "playback the control unit" should read
    --playback, the control unit--.

In claim 6, column 20, lines 48-49, "playback the image" should read
    --playback, the image--.

Signed and Sealed this

Eighth Day of June, 2010

David J. Kappos
*Director of the United States Patent and Trademark Office*